(12) United States Patent
Kang et al.

(10) Patent No.: US 8,866,198 B2
(45) Date of Patent: Oct. 21, 2014

(54) DISPLAY DEVICE AND METHOD FOR MANUFACTURING THE SAME

(75) Inventors: Min Kang, Seoul (KR); Jin Ho Ju, Seoul (KR); Jong Kwang Lee, Daejeon (KR)

(73) Assignee: Samsung Display Co., Ltd., Yongin (KR)

( * ) Notice: Subject to any disclaimer, the term of this patent is extended or adjusted under 35 U.S.C. 154(b) by 316 days.

(21) Appl. No.: 13/103,615

(22) Filed: May 9, 2011

(65) Prior Publication Data

US 2012/0138934 A1 Jun. 7, 2012

(30) Foreign Application Priority Data

Dec. 3, 2010 (KR) ........................ 10-2010-0122687

(51) Int. Cl.
*H01L 27/12* (2006.01)
(52) U.S. Cl.
USPC .......................................... 257/213; 257/291
(58) Field of Classification Search
CPC ..................... H01L 27/1214; H01L 27/124
See application file for complete search history.

(56) References Cited

U.S. PATENT DOCUMENTS

| 6,424,012 B1 * | 7/2002 | Kawasaki et al. ............. 257/350 |
| 2009/0262273 A1 * | 10/2009 | Yoon ................................. 349/46 |
| 2010/0127265 A1 | 5/2010 | Kim |
| 2010/0136755 A1 * | 6/2010 | Gi Jun et al. ................... 438/158 |

FOREIGN PATENT DOCUMENTS

| JP | 09-288283 | 11/1997 |
| JP | 2003-223119 | 8/2003 |
| JP | 2008-177398 | 7/2008 |
| KR | 1019990042090 | 6/1999 |
| KR | 1020050029512 | 3/2005 |

* cited by examiner

Primary Examiner — Jae Lee
(74) Attorney, Agent, or Firm — H.C. Park & Associates, PLC

(57) ABSTRACT

The present invention relates to a display device and a method of manufacturing the display device. The display device includes an insulation substrate, a gate conductor including a gate line and a gate electrode, an organic layer on the insulation substrate and the gate line, and a data conductor including a data line, a drain electrode, and a source electrode. The data line crosses the gate line. The gate electrode, the drain electrode, and the source electrode form a transistor, and a thickness of the gate electrode may be larger than a thickness of the gate line.

21 Claims, 17 Drawing Sheets

DISPLAY DEVICE AND METHOD FOR MANUFACTURING THE SAME

CROSS REFERENCE TO RELATED APPLICATION

This application claims priority from and the benefit of Korean Patent Application No. 10-2010-0122687 filed on Dec. 3, 2010, which is hereby incorporated by reference for all purposes as if fully set forth herein.

BACKGROUND OF THE INVENTION

1. Field of the Invention

Exemplary embodiments of the present invention relate to a display device and a method of manufacturing the same.

2. Description of the Background

Liquid Crystal Display (LCD) devices have rapidly gained an explosive market share of flat panel displays. Flat panel displays are display devices with a relatively thin screen size. Typical flat panel displays include a liquid crystal display and an organic light emitting diode display.

A LCD is one of the most widely-used flat panel displays at the present time, and may include two display panels with field generating electrodes, such as a pixel electrode and a common electrode, and a liquid crystal layer disposed between the pixel electrode and the common electrode. The LCD generates an electric field in the liquid crystal layer and determines a direction of liquid crystal molecules in the liquid crystal layer by applying voltage to the field-generating electrodes and controls polarization of incident light, thereby displaying an image.

The LCD may include a display panel with display signal lines (e.g., a gate line and a data line) and a pixel including a switching element that is implemented using a thin film transistor (TFT). The TFT may be a three terminal element.

The TFT may function as a switching element that transmits or blocks a data signal transmitted through the data line to the pixel in response to a gate signal that is transmitted through the gate line.

As the area and resolution of display devices, such as a LCD, increases, a signal delay, may be generated such that sufficient data signals fail to be supplied to the pixels. As a result, display characteristics of the display device may deteriorate as the area and resolution of display devices increases. Examples of a signal delay include Resistive-Capacitive (RC) delays.

Although the structure of the display signal line may be changed to prevent signal delays, changes in the display signal line structure may also deteriorate characteristics of the TFT.

The above information disclosed in this BACKGROUND section is only for enhancement of understanding of the background of the invention and therefore may contain information that does not form the prior art that is already known in this country to a person of ordinary skill in the art.

SUMMARY OF THE INVENTION

Exemplary embodiments of the present invention relate to a display device that may prevent TFT deterioration, and a method for manufacturing the display device.

Additional features of the invention will be set forth in the description which follows, and in part will be apparent from the description, or maybe learned by practice of the invention.

Exemplary embodiments of the present invention provide a display device including a substrate, a gate conductor, an organic layer, and a data conductor. The gate conductor includes a gate line and a gate electrode. The gate conductor is disposed on the substrate. The organic layer is disposed on the substrate and the gate line. The data conductor includes a data line, a drain electrode, and a source electrode. The data line crosses the gate line. A thickness of the gate electrode is larger than a thickness of the gate line.

Exemplary embodiments of the present invention provide a method of manufacturing a display device. The method includes forming a gate conductor including a gate line and a gate electrode on a substrate. A thickness of the gate electrode is larger than a thickness of the gate line. The method further includes forming an organic layer on the substrate and the gate line, and forming a data conductor including a data line, a drain electrode, and a source electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
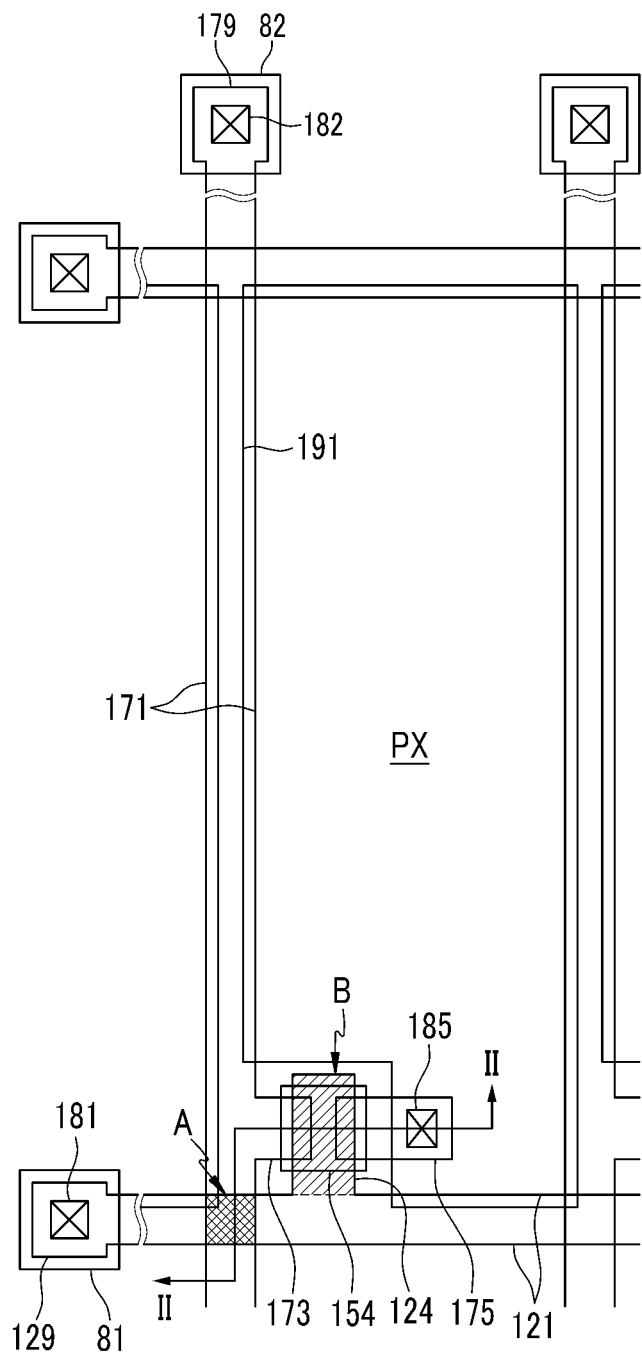
FIG. 1 is a layout view of a LCD according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

In the drawings, the thickness of layers, films, panels, regions, etc., may be exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
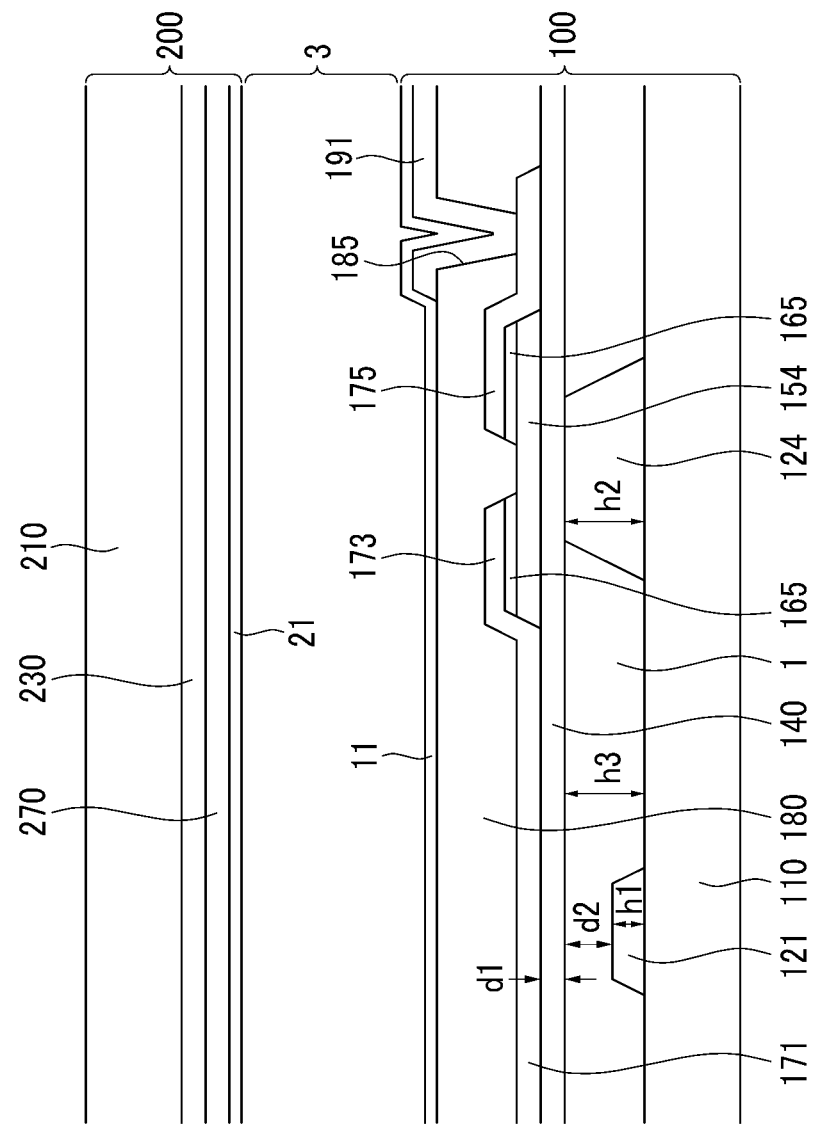
FIG. 2 is a cross-sectional view taken along line II-II in FIG. 1.

A LCD according to exemplary embodiments of the present invention is described hereafter in detail with reference to FIG. 1 and FIG. 2.

FIG. 1 is a layout view of an LCD according to exemplary embodiments of the present invention and FIG. 2 is a cross-sectional view taken along the line II-II of the LCD in FIG. 1 according to exemplary embodiments of the present invention.

Referring to FIG. 1 and FIG. 2, an LCD may include a lower display panel 100, and an upper display panel 200 facing the lower display panel 100, and a liquid crystal layer 3 interposed between the two display panels 100 and 200. A polarizer (not shown) may be disposed outside the display panels 100 and 200.

The lower display panel 100 is described first.

Gate conductors may be on an insulation substrate 110, which may be made of, for example, transparent glass or plastic. The gate conductor may include a plurality of gate lines 121 for transmitting gate signals and may be arranged in one direction, gate electrodes 124 protruding from the gate lines 121, and a wide end portion 129 for connection with another layer or date drivers (not shown). The gate lines 121 may be extended and directly connected to the gate driver (not shown) when the gate driver (not shown) is integrated on the substrate 110. In general, the insulation substrate 110 may be made of any suitable material, and is not limited to transparent glass or plastic.

The gate conductors 121, 124, and 129 may be made of a variety of conductive materials. For example, the gate conductors 121, 124, and 129 may be made of low-resistant metals, including, but not limited to, aluminum-based metals (e.g., aluminum (Al) or an aluminum alloy), silver-based metals (e.g., silver (Ag) or a silver alloy), and copper-based metals (e.g., copper (Cu) or a copper alloy). The gate conductors 121, 124, and 129 may have a multilayer structure including two conductive layers (not shown) which may have different physical properties. For example, the gate conductors 121, 124, and 129 may include a first conductive layer made of titanium-based metals (e.g., titanium (Ti) or a titanium alloy) and a second conductive layer made of copper-based metals (e.g., copper (Cu) or a copper alloy).

The thickness h2 of the gate electrode 124 may be larger than the thickness h1 of the gate line 121 (h2>h1). In some cases, the thickness h1 of the gate line 121 may be about 3000 Å to 20000 Å.

An organic layer 1 may be disposed on the insulation substrate 110 and the gate line 121. The organic layer 1 may be made of an organic insulator having a low dielectric constant (e.g., low relative permittivity). Examples of the organic insulator include hydrogen silsesquioxane (HSQ), methylsilsesquioxane (MSQ), polyimide, polynorbornenes (PN), benzocyclobutene, aromatic polymers, vapor-deposited parylene, parylene-F, fluorine-doped amorphous carbon, and polytetrafluroethylene (PTFE) Teflon. The organic insulator may have high thermal resistance.

The organic layer 1 may not be disposed on the gate electrode 124. The thickness h3 of the organic layer 1 may be substantially the same as the thickness h2 of the gate electrode 124, such that the surface of the organic layer 1 and the surface of the gate electrode 124 may be substantially level.

A gate insulating layer 140 may be disposed on the organic layer 1 and the gate electrode 124. The gate insulating layer 140 may be made of silicon nitride (SiNx) or silicon oxide (SiOx). In some cases, the dielectric constant of the organic layer 1 may be smaller than the dielectric constant of the gate insulating layer 140.

A plurality of semiconductor islands 154 may be disposed on the gate insulating layer 140. Each of the semiconductor islands 154 may be made of hydrogenated amorphous silicon (amorphous silicon is abbreviated to a-Si), polysilicon, or, in general, any suitable material. A semiconductor island 154 may be disposed on a gate electrode. A pair of ohmic contacts 163 and 165 may be formed on the semiconductor islands 154. The pair of ohmic contacts 163 and 165 may be located opposite to one other with the gate electrode 124 located between the pair of ohmic contacts 163 and 165. The ohmic contacts 163 and 165 may be made of n+ hydrogenated amorphous silicon doped with n-type impurities in high concentration or silicide. In general, any suitable material may be used to form the ohmic contacts 163 and 165.

A data conductor may include a plurality of data lines 171 and a plurality of drain electrodes 175, which may be disposed on the ohmic contacts 163 and 165 and the gate insulating layer 140.

The data lines 171 may transmit data signals and may cross with the gate lines 121. Each data line 171 may include a plurality of source electrode 173, which may extend towards the gate electrode 124, and a wide end portion 179 for connection with an external circuit.

The drain electrodes 175 may be disposed on the gate electrodes 124 and may be positioned at a predetermined distance from the source electrode 173.

The data conductors 171 and 175 may be made of refractory metals, such as molybdenum, chromium, tantalum, and titanium, or alloys of the noted refractory metals, and may have a multilayer structure which may include a refractory metal layer (not shown) and a low-resistant conductive layer (not shown). In some cases, the data conductors 171 and 175 may be made of the same metal as that of the gate conductors 121, 124, and 129. In general, the data conductors 171 and 175 may formed using any suitable material and in any suitable structure.

The gate electrode 124, the semiconductor island 154, source electrode 173 and drain electrode 175 may form a TFT. The channel of the TFT may be formed in a portion of the semiconductor island 154 that is between the source electrode 173 and the drain electrode 175.

The semiconductor island 154 may be partially exposed between the source electrode 173 and the drain electrode 175, and may not be covered by the data conductors 171, 173, and 175.

The gate conductors 121, 124, and 129 may include a gate line 121 that may transmit gate signals and a gate electrode 124 included in the TFT. The gate line 121 and the data line 171 may form a capacitor with a dielectric composed of the organic layer 1 and the gate insulating layer 140 interposed between the gate line 121 and the data line 171 at a region A (shown in FIG. 1 as a checked region) where the gate line 121 and the data line 171 may overlap. The capacitor may cause a RC delay of the signal lines 121 and 171. The capacitance of the capacitor may be proportionate to the dielectric constant and the areas of both ends (i.e., the gate line 121 and the data line 171) of the capacitor and may be inversely proportional to the distance between both ends. The distance d1+d2 between the gate line 121 and the data line 171 may be the same as the sum of the thickness d2 of the organic layer 1 on the gate line 121 and the thickness d1 of the gate insulating layer 140 in the region A. The thickness d2 of the organic layer 1 on the gate line 121 may be a difference between the thickness h2 of the gate electrode 124 and the thickness h1 of the gate line 121. Accordingly, it may be possible to reduce the capacitance of the capacitor by making the thickness h2 of the gate electrode 124 larger than the thickness h1 of the gate line 121. Further, it may be possible to reduce the capacitance of the capacitor by using an organic insulator having a low dielectric constant for the organic layer 1. Therefore, the RC delay of the signal lines 121 and 171 may be decreased.

The thickness h2 of the gate electrode 124 may be greater than the thickness h1 of the gate line 121 at the region B (shown in FIG. 1 by diagonal lines) where the gate electrode 124 may be formed. If the thickness h2 of the gate electrode 124 is not larger than the thickness h1 of the gate line 121, the organic layer 1 may be formed on the gate electrode 124 and the distance between the gate electrode 124 and the channel may be increased by the organic layer 1, such that characteristics of the TFT may deteriorate. Therefore, it is possible to prevent the characteristics of the TFT from being degraded by making the thickness h2 of the gate electrode 124 larger than the thickness h1 of the gate line 121 such that the distance between the gate electrode 124 and the channel is prevented from increasing.

Since the surface of the organic layer 1 and the surface of the gate electrode 124 are level, it is possible to prevent another layer that will be formed on the gate electrode 124 and the organic layer 1 from causing a defect, such as a disconnection.

A passivation layer 180 may be disposed on the data conductors 171, 173, and 175 and the exposed portion of the semiconductor islands 154. Contact holes 182 and 185 exposing the end portion 179 of the data line 171 and the drain electrode 175, respectively, may be formed through the passivation layer 180. Contact hole 181 exposing the end portion 129 of the gate line 121 may be formed through the passivation layer 180 and the gate electrode 140.

A pixel electrode 191 and a plurality of contact assistants 81 and 82 may be disposed on the passivation layer 180.

The pixel electrode 191 may be connected to the drain electrode 175 through the contact hole 185, and may receive a data signal from the drain electrode 175.

The contact assistants 81 and 82 may be connected to the end portion 129 of the gate line 121 and the end portion 179 of the data line 171 through the contact holes 181 and 182, respectively. The contact assistants 81 and 82 may supplement adhesion between the end portion 129 of the gate line 121 or the end portion 179 of the data line 171 and an external device, such as a driver IC, and may protect the end portions 129 and 179.

An alignment layer 11 may be disposed on the pixel electrode 191 and the passivation layer 180. In some cases, the alignment layer 11 may be a vertical alignment layer.

The upper display panel 200 is described hereafter.

The upper display panel 200 may have a plurality of light blocking members (not shown) called black matrixes spaced apart at a predetermined distance on an insulation substrate 210. In some cases, the light blocking members may be formed on lower display panel 100.

A color filter 230 may be disposed on the light blocking members of a pixel PX and the substrate 210. A common electrode 270 made of a transparent conductor, such as indium-tin-oxide (ITO) and indium-zinc-oxide (IZO), or a metal is formed on the color filter 230. The alignment layer 21 may be disposed on the common electrode 270. In some cases, the alignment layer 21 may be a vertical alignment layer.

The liquid crystal layer 3 interposed between the lower display panel 100 and the upper display panel 200 may include liquid crystal molecules having dielectric anisotropy. The liquid crystal molecules may be aligned with the long axes which may be perpendicular to the surfaces of the two display panels 100 and 200, under no electric field.

The pixel electrode 191 that has received a data signal may determine the direction of the liquid crystal molecules in the liquid crystal layer 3 interposed between the two electrodes 191 and 270 by generating an electric field together with the common electrode 270 of the upper display panel 200. A change in polarization of the light traveling in the liquid crystal layer 3 depends on the amount of inclination of the liquid crystal molecules and the change in polarization may be represented as a change in transmittance by a polarizer, such that the LCD displays an image.

A method of manufacturing an LCD according to exemplary embodiments of the present invention is described with reference to FIG. 3, FIG. 4, FIG. 5, FIG. 6, and FIG. 7.

FIG. 3, FIG. 4, FIG. 5, FIG. 6, and FIG. 7 illustrate an example of a method of manufacturing the lower display panel 100 of the LCD of FIG. 1 according to exemplary embodiments of the present invention.

Figure 3:
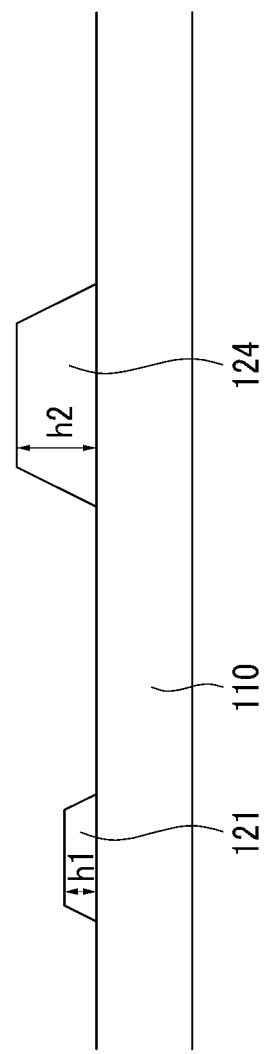
FIG. 3, FIG. 4, FIG. 5, FIG. 6, and FIG. 7 are views illustrating an example of a method of manufacturing a lower display panel of the LCD of FIG. 1.

Referring to FIG. 3, a gate conductor including the gate line 121 and the gate electrode 124 may be formed by stacking a gate conductive layer (not shown) on the insulation substrate 110 and applying photolithography. The thickness h2 of the gate electrode 124 may be greater than the thickness h1 of the gate line 121 (h2>h1). A method of forming a gate conductor having a different thickness is described in detail below.

Figure 4:
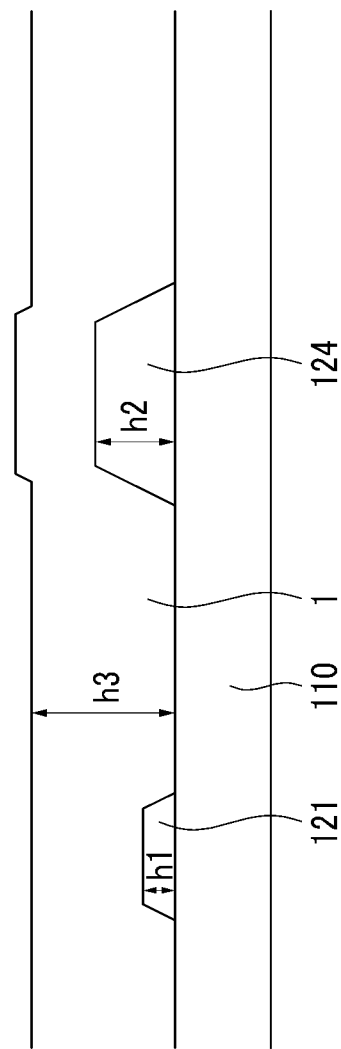

Referring to FIG. 4, the organic layer 1 may be disposed on the insulation substrate 110 and the gate conductors 121 and 124. The organic layer 1 may be coated with thickness h3, which may be larger than or equal to the thickness h2 of the gate electrode 124.

Figure 5:
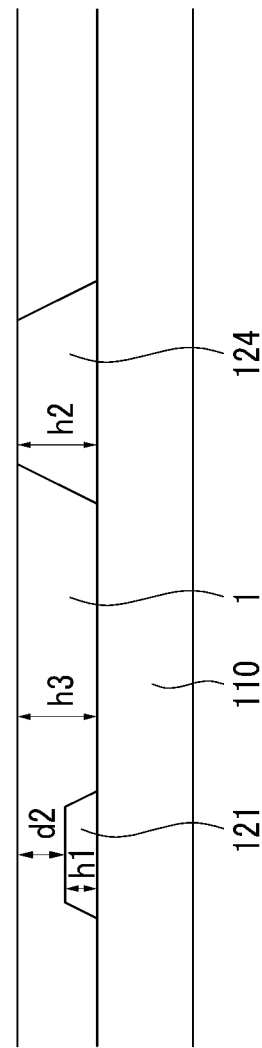

Referring to FIG. 5, the organic layer 1 may be etched until the gate electrode 124 is exposed. For example, the thickness h3 of the organic layer 1 may be made the same as the thickness h2 of the gate electrode 124 by etching. Since the organic layer 1 may be disposed with a large thickness as shown in FIG. 4, it is possible to achieve a flat organic layer 1 by etching.

Figure 6:
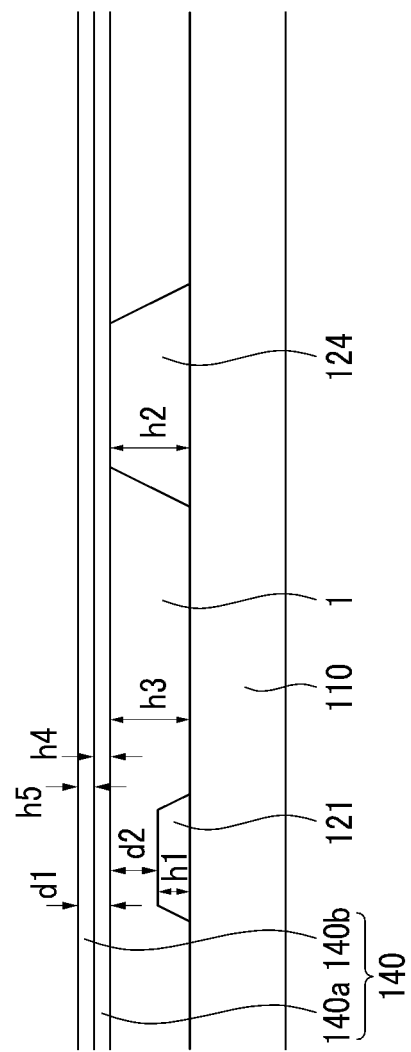

Referring to FIG. 6, the gate insulating layer 140 may be formed on the flat surfaces of the organic layer 1 and the gate electrode 124. The gate insulating layer 140 may be a double layer including a first insulating layer 140a and a second insulating layer 140b.

A double layer having different properties may be formed by adjusting deposition speed of the gate insulating layer 140. The first insulating layer 140a may be formed by depositing an insulating material at a first deposition speed and the second insulating layer 140b may be formed by depositing the same type of insulating material at a second deposition speed.

In some cases, the first deposition speed may be higher than the second deposition speed. Accordingly, the insulating material may be sparsely formed in the first insulating layer 140a and the insulating material may be more densely formed in the second insulating layer 140b. The second insulating layer 140b may prevent leakage current of the TFT. The second insulating layer 140b may be removed by etching. In some cases, the thickness h4 of the first insulating layer 140a may be about 4000 Å and the thickness h5 of the second insulating layer 140b may be about 500 Å. In general, any suitable thickness may be used for the thickness of the first insulating layer 140a or the second insulating layer 140b.

In some cases, the gate insulating layer 140 may be formed using only the second insulating layer 140b, without the first insulating layer 140a. When the gate insulating layer 140 is formed using only the second insulating layer 140b, the thickness d1 of the gate insulating layer 140 may be about 500 Å and the distance between the gate electrode 124 and the channel may be small, such that the characteristics of the TFT may be improved.

The organic layer 1 between the gate line 121 and the data line 171 may reduce the RC delay, even if the thickness d1 of the gate insulating layer 140 may decrease. This is because the organic layer 1 increases the distance between the gate line 121 and the data line 171, and the organic layer 1 has a low dielectric constant.

Figure 7:
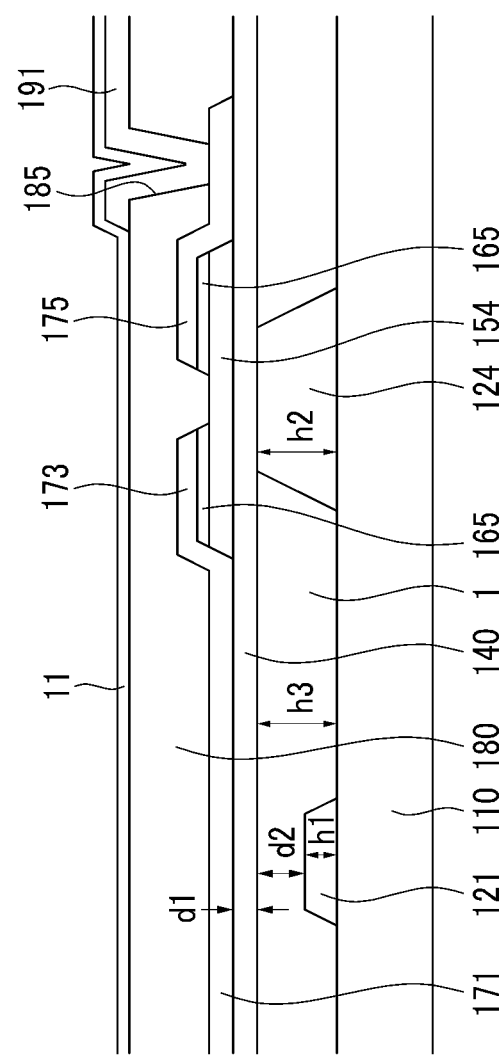

Referring to FIG. 7, the semiconductor island 154 may be formed on the gate insulating layer 140 and a pair of ohmic contacts 163 and 165 may be formed on the semiconductor island 154.

A data conductor including the data line 171, the source electrode 173, and the drain electrode 175 may be formed by stacking a data conductive layer (not shown) on the ohmic contacts 163 and 165 and the gate insulating layer 140 and subsequently applying photolithography.

The passivation layer 180 may be formed on the data conductors 171, 173, and 175 and the exposed portion of the semiconductor island 154. The contact hole 185 exposing the drain electrode 175 may be formed through the passivation layer 180.

The pixel electrode 191 connected to the drain electrode 175 through the contact hole 185 may be formed on the passivation layer 180.

The alignment layer 11 may be formed on the pixel electrode 191 and the passivation layer 180. Accordingly, the lower display panel 100 of the LCD is completed.

A method of forming gate conductors having different thicknesses on a substrate according to exemplary embodiments of the present invention, is described with reference to FIG. 8, FIG. 9, FIG. 10, FIG. 11, and FIG. 12.

Figure 8:
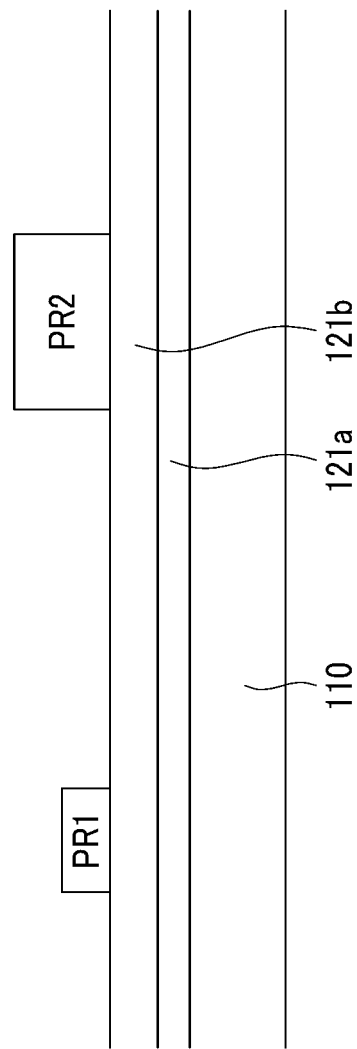
FIG. 8, FIG. 9, FIG. 10, FIG. 11, and FIG. 12 are views illustrating an example of a method of manufacturing gate conductors with different thicknesses on a substrate, as in FIG. 3.

Referring to FIG. 8, the first conductive layer 121a may be formed on an insulation substrate 110 and the second conductive layer 121b may be formed on the first conductive layer 121a. The first conductive layer 121a may be made of titanium-based metals and the second conductive layer 121b may be made of copper-based metals. In general, the first conductive layer 121a and the second conductive layer 121b may be made of any suitable materials.

Photoresist (PR) patterns PR1 and PR2 having different thicknesses may be formed by forming a PR layer (not shown) on the second conductive layer 121b and removing a portion of the PR layer using a mask. In this example, the PRs are positive, but an ordinarily skilled artisan can easily understand that negative PRs can alternatively be used.

The mask may have a fully transmissive portion that completely transmits light, a light blocking portion that may completely block light, and a semi-transmissive portion that may partially transmit light. The semi-transmissive portion may be a half tone pattern of a slit pattern.

The gate line 121 (see FIG. 1) may be formed using the semi-transmissive portion, the gate electrode 124 (see FIG. 1) may be formed using the light blocking portion, and no gate conductor is formed using the fully transmissive portion.

The PR pattern PR2 corresponding to the light blocking portion may be thicker than the PR pattern PR1 corresponding to the semi-transmissive portion.

Figure 9:
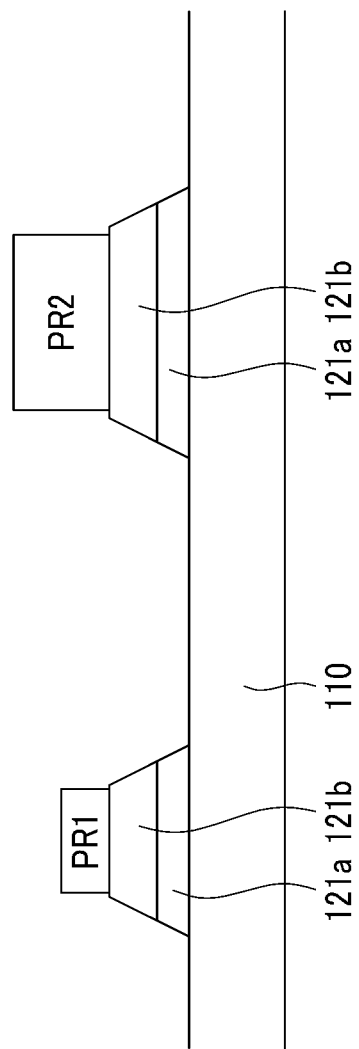

Referring to FIG. 9, the first conductive layer 121a and the second conductive layer 121b may be etched at the portion without the PR patterns PR1 and PR2, in accordance with the PR patterns PR1 and PR2.

Figure 10:
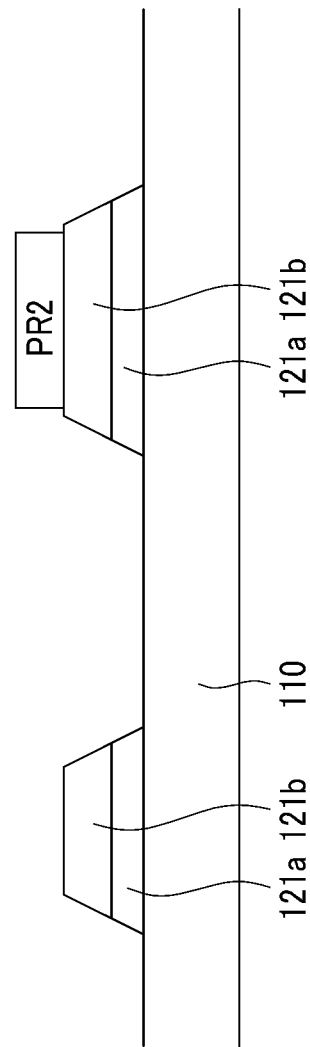

Referring to FIG. 10, a portion of the PR may be removed by an etch/back (E/B) process. For example, the PR1 pattern may be completely removed at the portion where the gate line 121 (see FIG. 1) may be formed, such that second conductive layer 121b may be exposed. The PR pattern PR2 may remain at the portion where the gate electrode 124 (see FIG. 1) may be formed. The thickness of the PR pattern PR2 may be smaller in FIG. 10 than FIG. 9.

Figure 11:
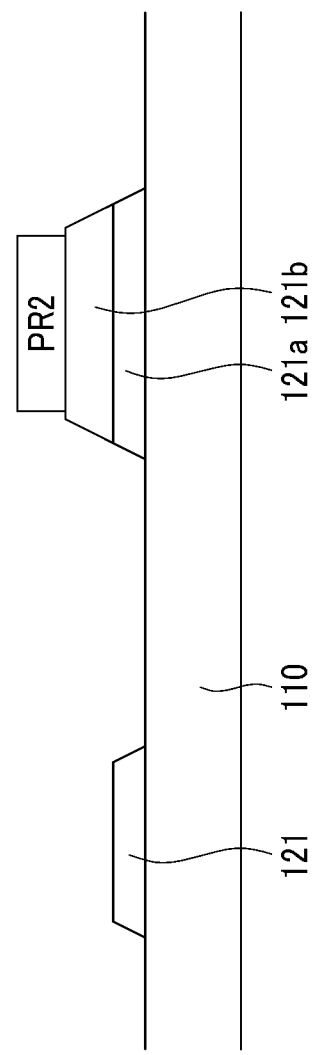

Referring to FIG. 11, the second conductive layer 121b on the first conductive layer 121a may be partially etched at the portion without the PR pattern PR2.

The partial etching can be achieved by using an etchant having a large etch rate of the second conductive layer 121b. The etch rate of the second conductive layer 121b may be larger than the etch rate of the first conductive layer 121a.

Figure 12:
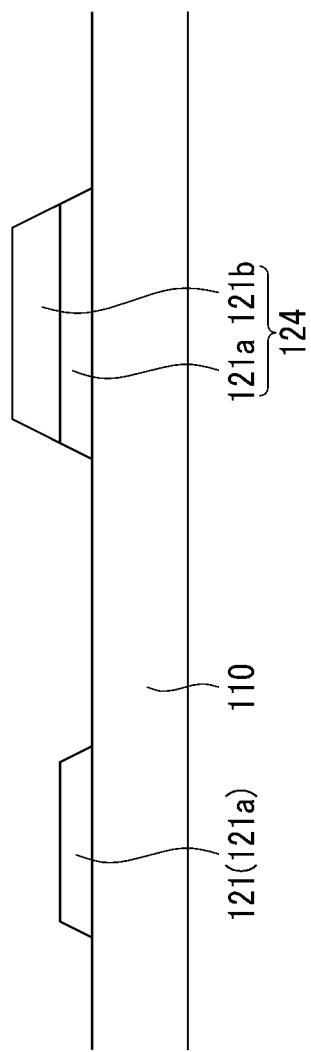

Referring to FIG. 12, gate conductors having different thicknesses may be formed on the insulation substrate 110 by removing the PR, including PR2. The gate line 121 may be formed in a single layer of the first conductive layer 121a and the gate electrode 124 may be formed in a double layer including the first conductive layer 121a and the second conductive layer 121b.

FIG. 13, FIG. 14, FIG. 15, FIG. 16, and FIG. 17 illustrate an example of a method of manufacturing gate conductors having different thicknesses on a substrate according to exemplary embodiments of the invention.

Figure 13:
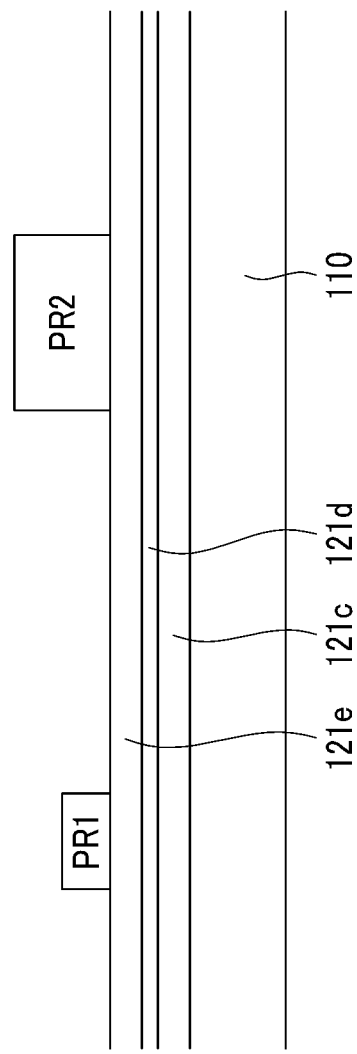
FIG. 13, FIG. 14, FIG. 15, FIG. 16, and FIG. 17 are views illustrating an example of a method of manufacturing gate conductors with different thicknesses on a substrate, as in FIG. 3.

Referring to FIG. 13, a first conductive layer 121c may be formed on the insulation substrate 110. An etching stop conductive layer 121d may be formed on the first conductive layer 121c, and a second conductive layer 121e may be formed on the etching stop conductive layer 121d. The first conductive layer 121c and the second conductive layer 121e may be made of any suitable material, and may, in comes cases, be made of the same material. In some cases, the first and second conductive layers 121c and 121e may be made of copper-based metals and the etching stop conductive layer 121d may be made of titanium-based metals.

A PR layer (not shown) may be formed on the second conductive layer 121e and PR patterns PR1 and PR2 which may have different thickness, may be formed by a mask having a semi-transmissive portion that may partially transmit light.

A PR pattern PR1 may be formed at the portion where the gate line 121 (see FIG. 1) may be formed. A PR pattern PR2 may be formed at the portion where the gate electrode 124 (see FIG. 1) may be formed, and no PR pattern may be formed at a portion without a gate conductor.

The PR pattern PR2 may be formed thicker than the PR pattern PR1.

Figure 14:
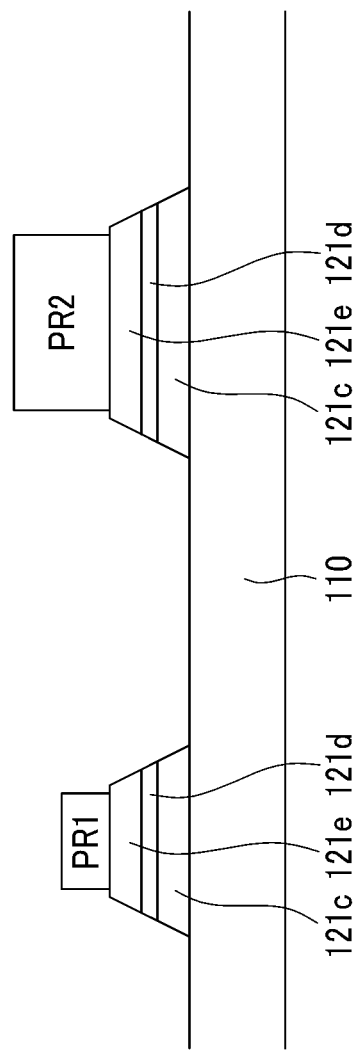

Referring to FIG. 14, the first and second conductive layers 121c and 121e and the etching stop conductive layer 121d may be etched at the portion without the PR patterns PR1 and PR2.

Figure 15:
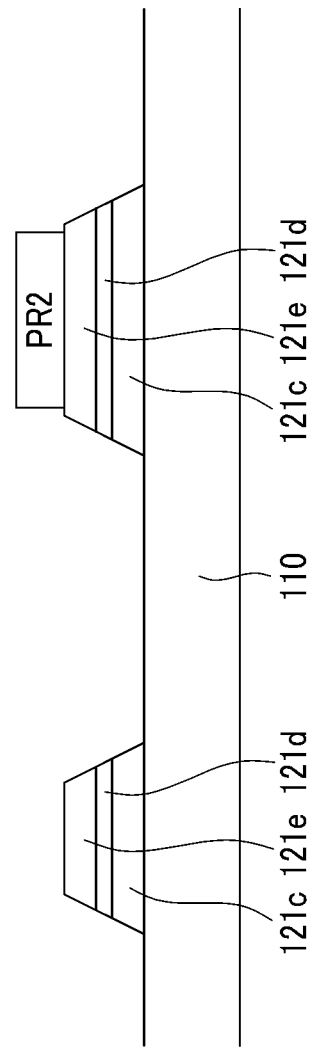

Referring to FIG. 15, a portion of the PR may be removed by an etch/back (E/B) process. Accordingly, the PR1 may be completely removed such that the second conductive layer 121e may be exposed. The PR pattern PR2 may remain at the portion where the gate electrode 124 is formed. The thickness of the PR pattern PR2 may be smaller in FIG. 15 than in FIG. 14.

Figure 16:
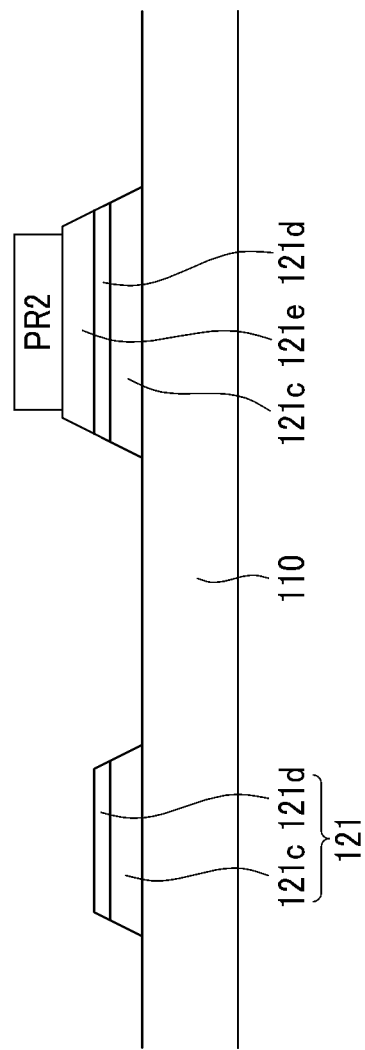

Referring to FIG. 16, the second conductive layer 121e on the etching stop conductive layer 121d may be etched at the portion without the PR pattern PR2.

The second conductive layer 121e on the etching stop conductive layer 121d may be partially removed using an etchant having an etch rate of the second conductive layer 121e that is larger than the etch rate of the etching stop conductive layer 121d. The first conductive layer 121c may not be etched even if the first conductive layer 121c may be made of the same material as the second conductive layer 121e.

Figure 17:
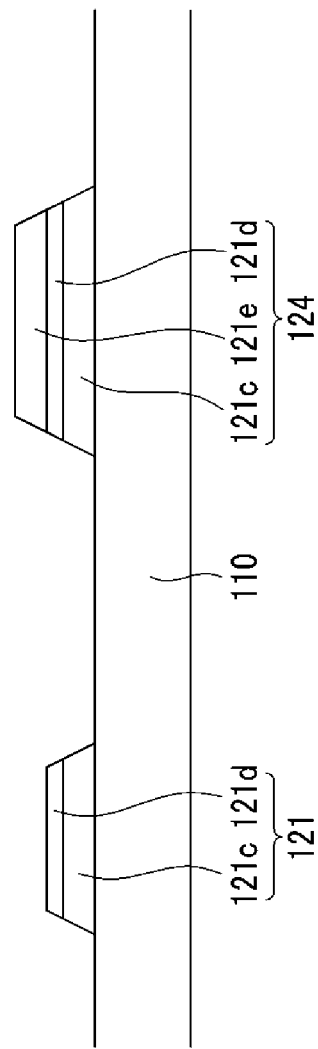

Referring to FIG. 17, gate conductors having different thicknesses may be formed on the insulation layer 110 by removing the PR. The gate line 121 may be formed in a double layer composed of the first conductive layer 121c and the etching stop conductive layer 121d. The gate electrode 124 may be formed in a triple layer composed of the first conductive layer 121c, the etching stop conductive layer 121d, and the second conductive layer 121e.

A method of manufacturing gate conductors having different thicknesses on a substrate, as shown in FIG. 3, has been described above. However, exemplary embodiments of the invention are not limited to a method of manufacturing gate conductors having different thicknesses on a substrate.

Exemplary embodiments of the present invention illustrate that a display device that does not degrade characteristics of a TFT may be provided while preventing a signal delay.

Exemplary embodiments of the present invention also illustrate that RC delay may be prevented by reducing capacitance generated between the gate line and the data line, by inserting an organic layer having a low dielectric constant between the gate line and the data line.

Exemplary embodiments of the present invention illustrate that degradation of TFT characteristics may be prevented by reducing a distance between the gate electrode and the channel by making the thickness of the gate electrode larger than that thickness of the gate line. Further, since it is possible to make the thickness of the gate insulating layer small, it is possible to improve the characteristics of the TFT.

In addition, since the surface of the organic layer and the surface of the gate electrode are level, it may be possible to prevent a defect, such as a disconnection.

Further, a method of manufacturing a display device according to exemplary embodiments of the present invention can be used for the existing methods of manufacturing display devices, such that the methods of manufacturing display devices are not complicated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a substrate;
   a gate conductor comprising a gate line and a gate electrode, the gate conductor being disposed on the substrate;
   an organic layer disposed on the substrate and the gate line, wherein the organic layer exposes at least a portion of the gate electrode; and
   a data conductor comprising a data line, a drain electrode, and a source electrode,
   wherein the data line crosses the gate line with the organic layer being disposed between the data line and the gate line, and
   wherein a thickness of the gate electrode is larger than a thickness of the gate line.

2. The display device of claim 1, further comprising:
   a gate insulating layer disposed on the organic layer and on the gate electrode.

3. The display device of claim 2, wherein the organic layer and the gate electrode have a level surface.

4. The display device of claim 3, wherein the gate insulating layer is disposed on a flat surface of the organic layer and a flat surface of the gate electrode.

5. The display device of claim 4, further comprising:
a semiconductor disposed between the gate insulating layer and the data conductor.

6. The display device of claim 1, wherein the thickness of the gate line is in a range of 3,000 Å to 20,000 Å.

7. The display device of claim 6, wherein the thickness of the gate insulating layer is 500 Å.

8. The display device of claim 1, wherein the gate line and the gate electrode each comprise a first conductive layer, and the gate electrode, but not the gate line, comprises a second conductive layer.

9. The display device of claim 8, wherein the first conductive layer comprises a titanium-based metal and the second conductive layer comprises a copper-based metal.

10. The display device of claim 1, wherein each of a first conductive layer and an etching stop conductive layer comprise the gate line, and wherein each of the first conductive layer, the etching stop conductive layer, and a second conductive layer comprise the gate electrode.

11. The display device of claim 10, wherein the etching stop conductive layer comprises a titanium-based metal and the first conductive layer and the second conductive layer comprise a copper-based metal.

12. A display device, comprising:
a substrate;
a gate conductor comprising a gate line and a gate electrode, the gate conductor being disposed on the substrate;
an organic layer disposed on the substrate and the gate line, wherein the organic layer exposes at least a portion of the gate electrode;
an insulating layer; and
a data conductor comprising a data line, a drain electrode, and a source electrode,
wherein the data line crosses the gate line with the organic layer and the insulating layer being disposed between the data line and the gate line, and
wherein a thickness of the gate electrode is larger than a thickness of the gate line.

13. The display device of claim 12, wherein the insulating layer is disposed between the organic layer and the data line.

14. The display device of claim 12, wherein the organic layer is disposed directly on the substrate and directly on the gate line.

15. The display device of claim 14, wherein the organic layer is further disposed directly on a side surface of the gate electrode.

16. The display device of claim 15, wherein the insulating layer is disposed directly on an uppermost surface of the gate electrode.

17. The display device of claim 12, further comprising:
a semiconductor disposed on the gate electrode and under the source electrode and the drain electrode.

18. The display device of claim 17, wherein the insulating layer is disposed between the gate electrode and the semiconductor.

19. The display device of claim 18, wherein a lower surface of the insulating layer is disposed directly on the gate electrode, and a lower surface of the semiconductor is disposed directly on an upper surface of the insulating layer.

20. The display device of claim 12, wherein an upper surface of the gate electrode and an upper surface of the organic layer together form a substantially planar surface on the substrate.

21. The display device of claim 20, wherein the insulating layer is disposed directly on the upper surface of the gate electrode and directly on the upper surface of the organic layer.

* * * * *